(12) United States Patent
Nagara

(10) Patent No.: US 12,526,300 B2
(45) Date of Patent: Jan. 13, 2026

(54) ATTACK ANALYSIS DEVICE, ATTACK ANALYSIS METHOD, AND STORAGE MEDIUM

(71) Applicant: DENSO CORPORATION, Kariya (JP)

(72) Inventor: Keigo Nagara, Kariya (JP)

(73) Assignee: DENSO CORPORATION, Kariya (JP)

( * ) Notice: Subject to any disclaimer, the term of this patent is extended or adjusted under 35 U.S.C. 154(b) by 210 days.

(21) Appl. No.: 18/462,475

(22) Filed: Sep. 7, 2023

(65) Prior Publication Data

US 2024/0089281 A1    Mar. 14, 2024

(30) Foreign Application Priority Data

Sep. 14, 2022    (JP) ................................. 2022-146081

(51) Int. Cl.
*H04L 9/40* (2022.01)

(52) U.S. Cl.
CPC ...... *H04L 63/1425* (2013.01); *H04L 63/1416* (2013.01)

(58) Field of Classification Search
CPC .................................................. H04L 63/1425
See application file for complete search history.

(56) References Cited

U.S. PATENT DOCUMENTS

| | | | |
|---|---|---|---|
| 12,003,521 B2 * | 6/2024 | Kishikawa | H04L 12/40 |
| 2008/0129828 A1 * | 6/2008 | Luithlen | G08B 13/19676 348/207.99 |
| 2018/0316680 A1 * | 11/2018 | Kishikawa | H04L 63/1425 |
| 2019/0275891 A1 * | 9/2019 | Shidai | G07C 5/008 |
| 2020/0128031 A1 * | 4/2020 | Juliato | H04L 63/1416 |
| 2021/0029147 A1 * | 1/2021 | McCanty | H04W 12/009 |
| 2022/0103583 A1 * | 3/2022 | Torisaki | H04L 63/1441 |
| 2022/0286858 A1 * | 9/2022 | Saito | H04W 12/08 |
| 2022/0309153 A1 | 9/2022 | Nagara et al. | |
| 2023/0110820 A1 * | 4/2023 | Kreines | H04L 63/1466 726/23 |
| 2023/0262080 A1 * | 8/2023 | Ishii | H04L 63/1416 709/224 |
| 2023/0275877 A1 * | 8/2023 | Harel | G01C 21/3822 713/189 |
| 2023/0319085 A1 * | 10/2023 | Fujii | H04L 63/1433 726/23 |
| 2024/0223581 A1 * | 7/2024 | Takeuchi | H04L 67/12 |
| 2025/0071036 A1 * | 2/2025 | Kurachi | H04L 12/28 |

FOREIGN PATENT DOCUMENTS

| | | |
|---|---|---|
| JP | 2016-143320 A | 8/2016 |
| JP | 2020-123307 A | 8/2020 |
| JP | 2022-153081 A | 10/2022 |

* cited by examiner

*Primary Examiner* — Hieu T Hoang

(74) *Attorney, Agent, or Firm* — Harness, Dickey & Pierce, P.L.C.

(57) ABSTRACT

An attack analysis device acquires a security log generated by a security sensor mounted on each of a plurality of electronic control units configuring an electronic control system, sets a log package in which a plurality of the security logs are packaged, estimates an attack received by the electronic control system based on the log package, and outputs attack information indicating the estimated attack.

12 Claims, 12 Drawing Sheets

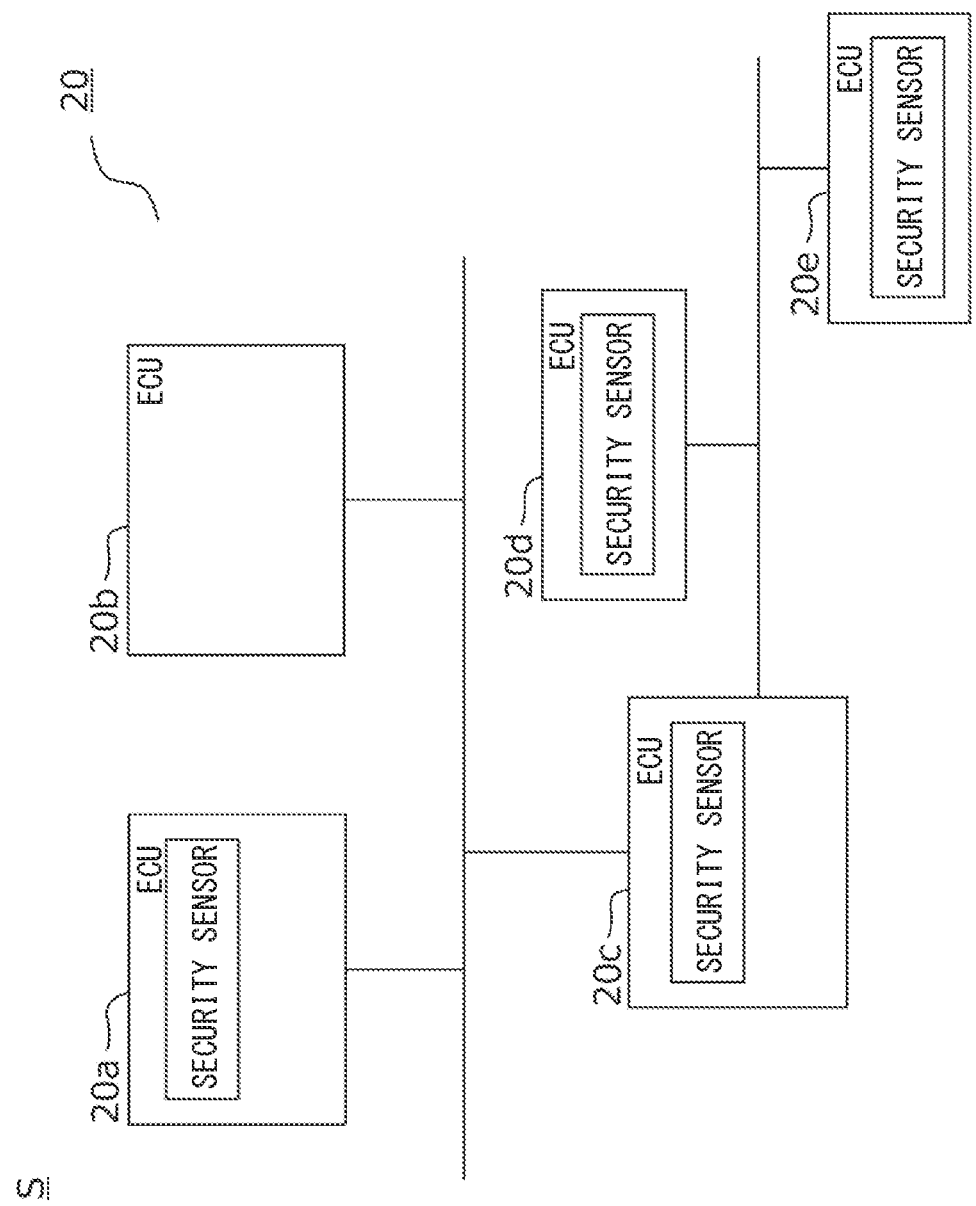

FIG. 6

| ATTACK INFO | | | ESTIMATION ABNORMALITY INFO / COMMONIZED ESTIMATION ABNORMALITY LOCATION INFO | | | | | | | | | | |
|---|---|---|---|---|---|---|---|---|---|---|---|---|---|
| | | | COMMUNICATION ECU | | | | MC | | | | ECU20a | | |
| ATTACK TYPE | ATTACK START POINT | ATTACK TARGET | ABNOR-MALITY A | ABNOR-MALITY B | ABNOR-MALITY C | ABNOR-MALITY D | ABNOR-MALITY A | ABNOR-MALITY B | ABNOR-MALITY C | ABNOR-MALITY D | ABNOR-MALITY A | ABNOR-MALITY B | ABNOR-MALITY C |
| ATTACK A | OUTSIDE | COMMUNI-CATION ECU | ○ | — | — | — | — | — | — | — | — | — | — |
| ATTACK B | COMMUNI-CATION ECU | MC | — | — | — | — | ○ | — | — | ○ | — | — | — |
| ATTACK C | MC | MC | — | — | — | — | — | ○ | ○ | ○ | — | — | — |
| ATTACK D | COMMUNI-CATION ECU | MC | — | — | — | — | ○ | ○ | ○ | — | — | — | — |
| ... | | | | | | | | | | | | | |
| ATTACK X | MC | ECU 20a | — | — | — | — | — | — | — | — | — | ○ | ○ |

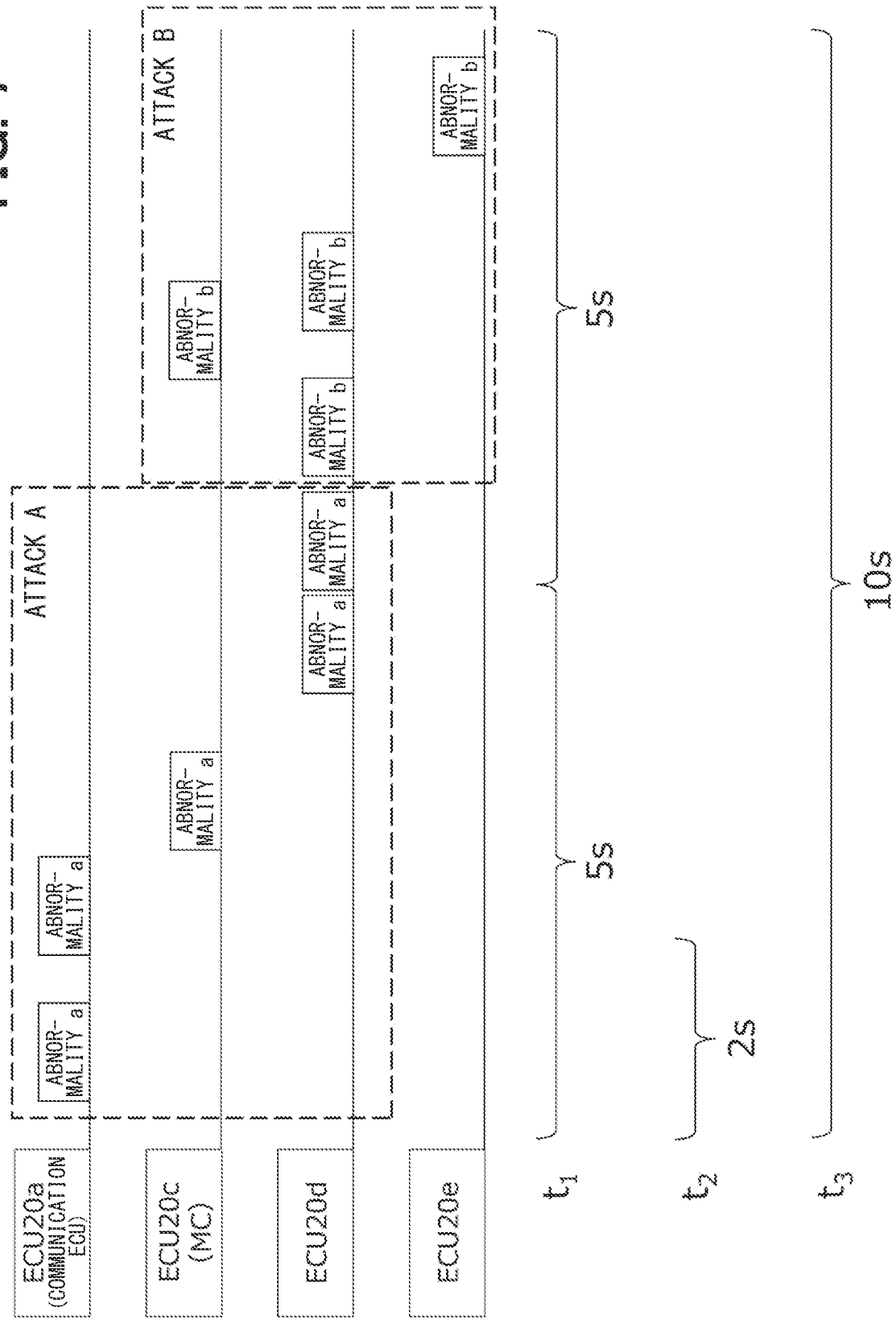

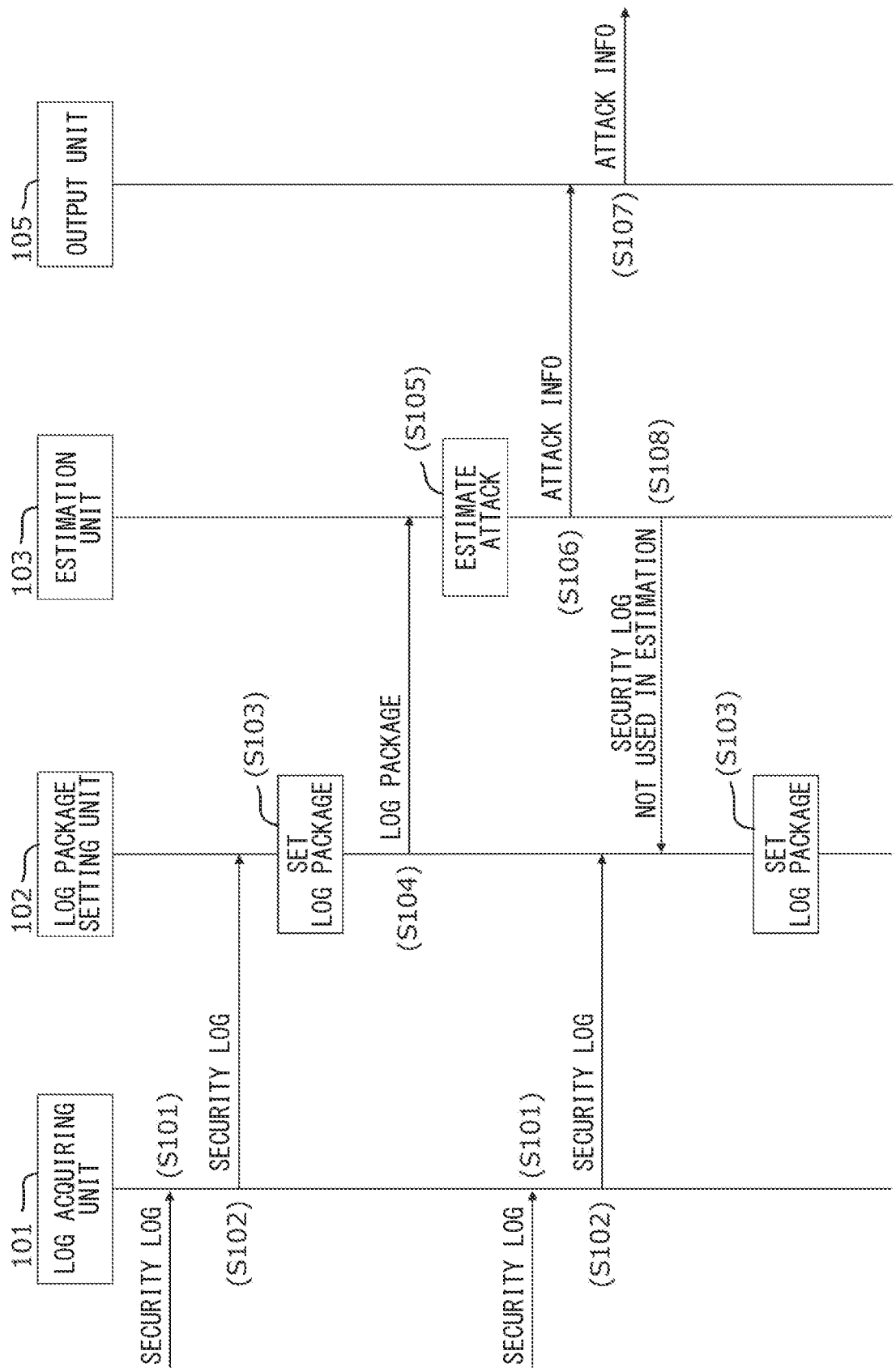

ATTACK ANALYSIS DEVICE, ATTACK ANALYSIS METHOD, AND STORAGE MEDIUM

CROSS REFERENCE TO RELATED APPLICATION

The present application claims the benefit of priority from Japanese Patent Application No. 2022-146081 filed on Sep. 14, 2022. The entire disclosure of the above application is incorporated herein by reference.

TECHNICAL FIELD

The present disclosure relates to an attack analysis device, an attack analysis method, and a storage medium, each of which analyzes an attack received by an electronic control system mounted to a moving object, such as a vehicle.

BACKGROUND

In recent years, technologies for driving support and autonomous driving control, including V2X such as vehicle-to-vehicle communication and roadside-to-vehicle communication, have been attracting attention. Along with this, vehicles have come to be equipped with a communication function, and vehicles are becoming more connected. As a result, a probability that a vehicle may receive a cyberattack such as unauthorized access increases. Therefore, it may be necessary to analyze cyberattacks on vehicles and to take countermeasures against the cyberattacks.

SUMMARY

An attack analysis device acquires a security log generated by a security sensor mounted on each of a plurality of electronic control units configuring an electronic control system, sets a log package in which a plurality of the security logs are packaged, estimates an attack received by the electronic control system based on the log package, and outputs attack information indicating the estimated attack.

BRIEF DESCRIPTION OF DRAWINGS

Objects, features and advantages of the present disclosure will become apparent from the following detailed description made with reference to the accompanying drawings.

FIG. 2 is a diagram illustrating an exemplary configuration of the electronic control unit according to each embodiment.

FIG. 6 is a diagram illustrating an attack abnormality relationship table stored in a table storage unit of the attack analysis device according to the first embodiment.

FIG. 7 is a diagram illustrating a setting method (during a predetermined period) of the log package setting unit of the attack analysis device according to the first embodiment.

FIG. 8 is a diagram illustrating an operation of the attack analysis device according to the first embodiment.

DETAILED DESCRIPTION

There are various technologies for detecting abnormalities occurred in vehicles and analyzing the cyberattacks based on the detected abnormalities. In a known art, detected abnormality data is collected, and a combination of items in which the abnormalities are detected is compared with an abnormality detection pattern specified in advance for each attack. Then, the type of attack corresponding to the abnormality is specified.

The inventor of the present disclosure has found the following difficulties. In a known attack identifying method, detected abnormal data is compared with an abnormality detection pattern. However, how to group the detected abnormality data, that is, a unit or a set of security logs used for analysis and collation is not clearly specified. The efficiency of analysis and comparing may be improved by dividing the security log group into meaningful units with respect to the security logs that are sporadically increased.

According to an aspect of the present disclosure, an attack analysis device acquires a security log generated by a security sensor mounted on each of a plurality of electronic control units configuring an electronic control system, sets a log package in which a plurality of the security logs are packaged, estimates an attack received by the electronic control system based on the log package, and outputs attack information indicating the estimated attack.

With the above-described configuration, the attack analysis device of the present disclosure can efficiently analyze and collate the security log, and as a result, it is possible to improve the detection accuracy of the attack.

The following will describe embodiments of the present disclosure with reference to the drawings.

Any effects described in embodiments may be effects obtained by a configuration of an embodiment as an example of the present disclosure, and may not be necessarily effects of the present disclosure.

In the present disclosure, the configuration disclosed in each embodiment is not limited to each embodiment alone, but may be combined across the embodiments. For example, a configuration disclosed in one embodiment may be combined with another embodiment. The disclosed configurations in respective multiple embodiments may be partially combined with one another.

1. Premise Configurations of Each Embodiment

Figure 1A:
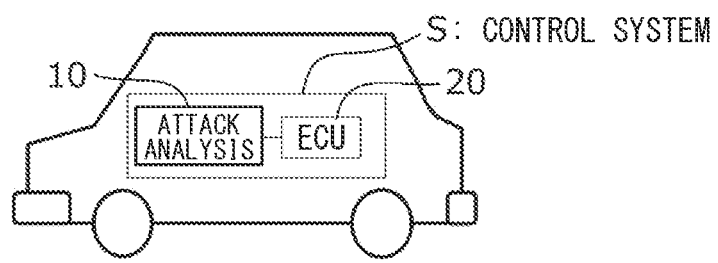
FIG. 1A to FIG. 1C are diagrams each illustrating an exemplary arrangement of an attack analysis device and an electronic control system according to each embodiment.
Figure 1B:
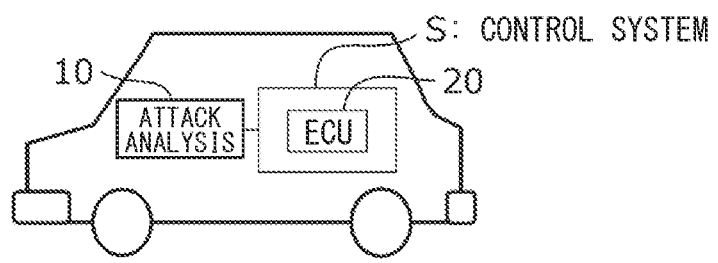
Figure 1C:
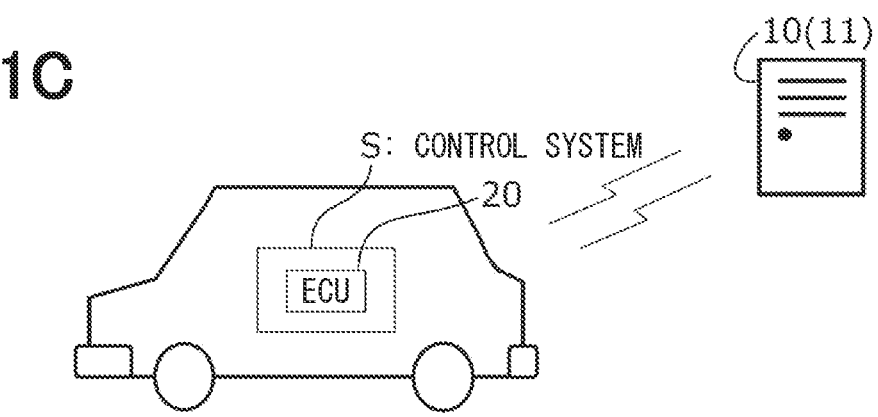

(1) Arrangement of Attack Analysis Device and Electronic Control System S in Each Embodiment FIG. 1A to FIG. 1C are diagrams each illustrating an arrangement of an attack analysis device according in each embodiment. For example, as illustrated in FIG. 1A and FIG. 1B, the attack analysis device 10 may be mounted on a vehicle, which corresponds to a moving object, together with an electronic control unit 20 constituting an electronic control system S. As illustrated in FIG. 1C, the electronic control unit 20 constituting the electronic control system S may be mounted on a vehicle, which corresponds to a moving object, and the attack analysis device 10 may be implemented by a server device or the like disposed outside the vehicle.

The term "moving object" refers to a movable object, and a travel speed of the moving object may be arbitrary. The moving object also includes a state where the moving object is in stationary state. Examples of the moving object include automobiles, motorcycles, bicycles, pedestrians, ships, aircrafts, and objects mounted thereon. However, the moving object is not limited to these examples.

The term "mounted" includes not only a case where an object is directly fixed to the moving object but also a case where an object moves together with the moving object although the object is not fixed to the moving object. The term "mounted" also includes a case where the device is carried by a person in the moving object, or a case where the device is mounted on a load located to be carried by the moving object.

The attack analysis device 10 analyzes a cyberattack on the electronic control system S. Specifically, the attack analysis device 10 acquires security log from multiple electronic control units (hereinafter referred to as ECU), which constitute the electronic control system S, and analyzes the cyberattack.

Here, the "electronic control unit" may be not only a physically independent electronic control unit but also a virtual electronic control unit implemented by using a virtualization technology.

FIG. 2 is a diagram showing a configuration example of the electronic control system S. The electronic control system S includes multiple ECUs 20. Although FIG. 2 shows five ECUs including ECU 20a to ECU 20e as an example, the electronic control system S may include any number of ECUs. In the following description, the ECU 20 or each ECU 20 will be used when describing a single or multiple electronic control units as a whole, and the ECU 20a, ECU 20b, ECU 20c, etc. will be used when individually describing specific electronic control unit.

In the electronic control system S shown in FIG. 2, each ECU 20a, 20c, 20d, and 20e has a security sensor. The ECU 20b does not have a security sensor. When security sensors are installed on multiple ECUs 20 that constitute the electronic control system S, it is not necessary for all ECUs 20 to have security sensors. Alternatively, all ECUs 20 may have security sensors.

The electronic control system S can be configured by any ECU. The electronic control unit (ECU) may be, for example, a drive system electronic control device that controls an engine, a steering wheel, a brake, etc. The ECU may be, for example, a vehicle body electronic control device that controls a meter, and a power window, etc. The ECU may be, for example, an information system electronic control device such as a navigation device. The ECU may be, for example, a safety control electronic control device that controls to prevent a collision with an obstacle or a pedestrian. The ECUs may be in parallel relationship with one another. Alternatively, the ECUs may be classified as masters and slaves. The electronic control system S may be provided with a mobility computer (MC) that connects the electronic control units to one another, and an external communication ECU that communicates with the outside of the vehicle. For example, the ECU 20a may be an external communication ECU, and the ECU 20c may be an MC.

Further, the ECU 20 may be a physically independent ECU. The ECU 20 may be a virtual ECU (may be referred to as a virtual machine) that is virtually implemented.

In the case of FIG. 1A and FIG. 1B, the attack analysis device 10 and each ECU 20 are connected with one another via an in-vehicle communication network such as controller area network (CAN) or local interconnect network (LIN). Alternatively, the attack analysis device 10 and the ECU may be connected via any communication method, such as wired or wireless communication including Ethernet (registered trademark), Wi-Fi (registered trademark), or Bluetooth (registered trademark).

Here, the term "connect" refers to a state in which data can be exchanged, and includes, a case where different hardware circuits are connected via a wired or wireless communication network and a case where virtual machines are virtually connected to each other.

FIG. 1A illustrates the attack analysis device 10 is independently provided inside the electronic control system S, or function of the attack analysis device 10 is built in at least one of the ECU 20 configuring the electronic control system S. At least one of the ECU may be a MC or an external communication ECU.

FIG. 1B is a diagram in which the attack analysis device 10 is provided outside the electronic control system S. From the view point of connection, configuration shown in FIG. 1B is substantially the same as that of FIG. 1A.

In the configuration shown in FIG. 1C, the attack analysis device 10 is disposed outside the electronic control system S. Since the attack analysis device 10 is disposed outside the vehicle, the connection is different in the configuration of FIG. 1C compared with those of FIG. 1A and FIG. 1B. The attack analysis device 10 and the electronic control system S are connected with one another via a communication network of wireless communication, such as IEEE 802.11 (Wi-Fi (registered trademark)), IEEE 802.16 (WiMAX (registered trademark)), W-CDMA (Wideband Code Division Multiple Access), HSPA (High Speed Packet Access), LTE (Long Term Evolution), LTE-A (Long Term Evolution Advanced), 4G, or 5G. Alternatively, dedicated short range communication (DSRC) may be used for the communication between the attack analysis device 10 and the electronic control system S. When the vehicle is parked in a parking lot or housed in a repair shop, a wired communication system may be used instead of a wireless communication system. For example, a local area network (LAN), the Internet, or a fixed telephone line may be used. Incidentally, even when the vehicle is parked in a parking lot or housed in a repair shop, the attack analysis device 10 and the electronic control system S may be connected with one another via a wireless communication system.

In the above description of FIG. 1A to FIG. 1C and FIG. 2 and section (1), the attack analysis device 10 of the first embodiment is described as an example. Alternatively, the above description may also be applied to an attack analysis device 11 of the second embodiment.

In the following embodiments, a case of the arrangement shown in FIG. 1C will be described as an example.

In each embodiment, a vehicle system equipped to a vehicle will be described as an example of the electronic control system S. However, the electronic control system S is not limited to a vehicle system, and may be applied to any kind of electronic control system including multiple ECUs. For example, the electronic control system S may be mounted on a stationary object instead of a moving object.

(2) Details of Security Log

Figure 3:
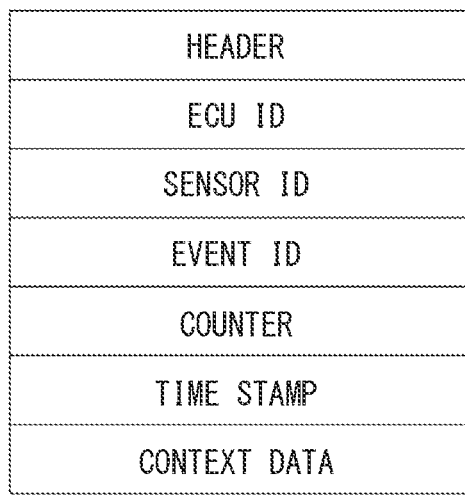
FIG. 3 is a diagram illustrating a security log generated by a security sensor of the electronic control unit according to each embodiment.

FIG. 3 is a diagram illustrating contents of a security log generated by the security sensor of the ECU 20.

The security log includes multiple fields, and the multiple fields include an ECU ID (corresponding to ECU type information) indicating identification information of an ECU on which the security sensor is mounted, a sensor ID (corresponding to sensor type information) indicating identification information of the security sensor, an event ID (corresponding to event type information) indicating identification information of security event, a counter indicating the occurrence number of the event, a time stamp indicating an occurrence time of the event, and context data indicating details of an output of the security sensor. The security log may further include a header storing information indicating the version of protocol and the state of each field.

According to the specifications defined by AUTOSAR (AUTomotive Open System ARchitecture), IdsM Instance ID corresponds to ECU ID, Sensor Instance ID corresponds to the sensor ID, Event Definition ID corresponds to the event ID, Count corresponds to the counter, Timestamp corresponds to the timestamp, Context Data corresponds to the context data, Protocol Version and Protocol Header correspond to the header, respectively.

FIG. 3 shows an example of an abnormal log. A normal log may have the same specification as that of FIG. 3. In that case, the context data of the normal log may be omitted. By setting a flag indicating the presence or absence of the context data in the header, it may be possible to identify the abnormal log and the normal log by checking the flag set in the header.

FIG. 3 shows a security log generated by a physical and independent ECU 20. The security log may be generated by a virtual ECU.

2. First Embodiment (1) Configuration of Attack Analysis Device 10

Figure 4:
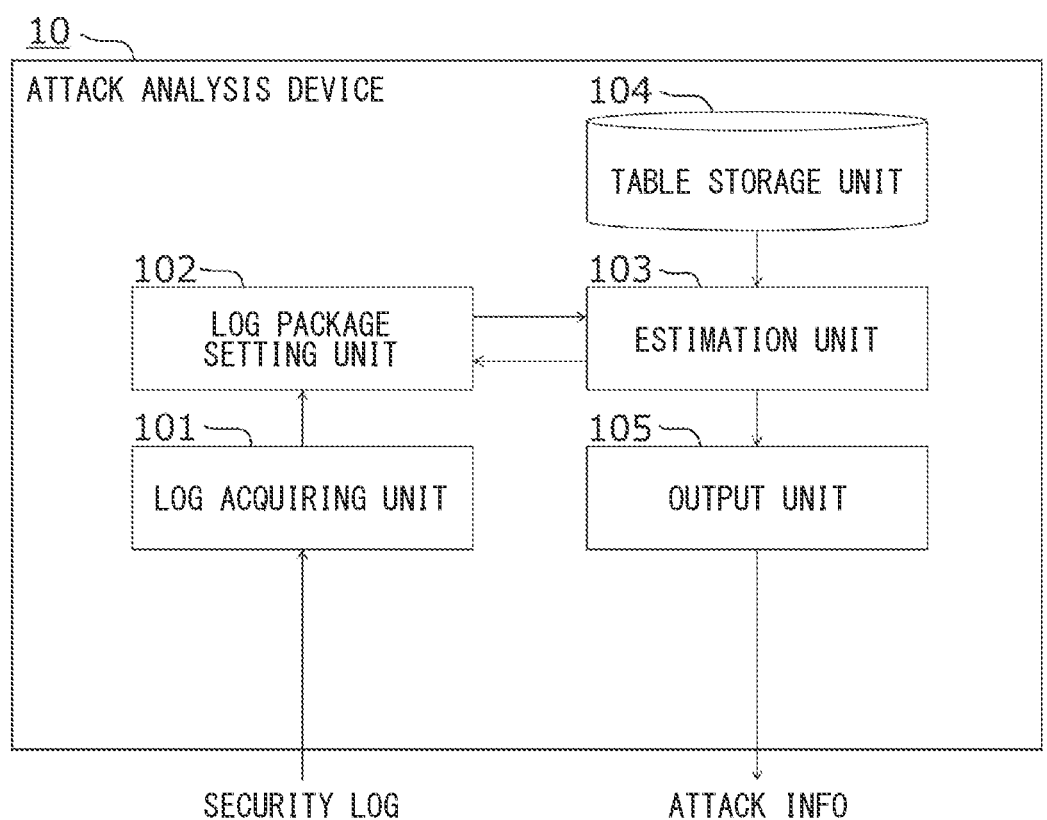
FIG. 4 is a block diagram illustrating an exemplary configuration of the attack analysis device according to a first embodiment.

FIG. 4 is a block diagram illustrating a configuration of the attack analysis device 10 according to the present embodiment. The attack analysis device 10 includes a log acquiring unit 101, a log package setting unit 102, an estimation unit 103, a table storage unit 104, and an output unit 105.

The log acquiring unit 101 acquires a security log generated by a security sensor mounted on each ECU 20 constituting the electronic control system S. As described above, the configuration of the electronic control system S is shown in FIG. 2, and contents of the security log are shown in FIG. 3. When the attack analysis device 10 is arranged as illustrated in FIG. 1C relative to the electronic control system S, the log acquiring unit 101 acquires the security log by receiving the security log via a communication network of wireless communication method.

The log package setting unit 102 sets a log package in which multiple security logs acquired by the log acquiring unit 101 are packaged.

Here, the term "set" indicates that a range of the security log included in the log package is specified.

Figure 5A:
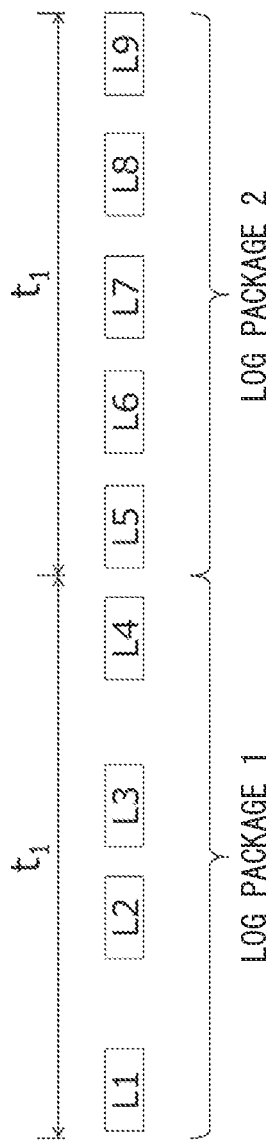
FIG. 5A and FIG. 5B are diagrams each illustrating a log package set by a log package setting unit of the attack analysis device according to the first embodiment.
Figure 5B:
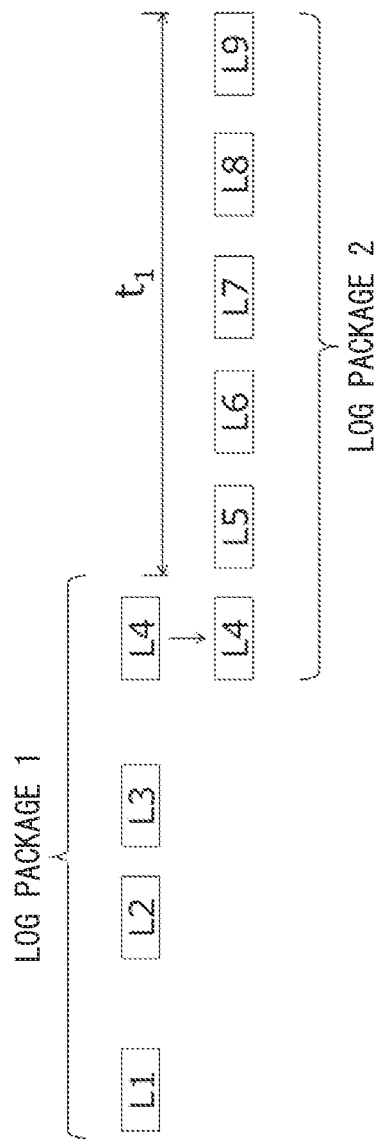

FIG. 5A and FIG. 5B are diagrams illustrating setting of log packages. The log acquiring unit 101 sequentially receives the security logs (L1 to L9) from the respective security sensors of multiple ECUs 20, the security logs can be arranged in the order of reception. Then, a log package is set by collecting multiple security logs according to a certain rule. For example, in the case of FIG. 5A, the received logs are divided for each period of t1, and security log group corresponding to each period is included in a log package. In this example, a log package 1 including security log group of L1 to L4 and a log package 2 including security log group of L5 to L9 are set. Other specific examples of the certain rule will be described later.

Note that a gap between log packages may be referred to as a separation between log packages. The setting of the log packages is technically the same as detecting a separation between the security logs and separating one security log from another security log.

The estimation unit 103 estimates an attack on the electronic control system S based on the log package set by the log package setting unit 102.

Here, the term "based on" indicates that an attack may be estimated in units of log packages, and includes a case where all security logs included in one log package are used and a case where partial security logs included in one log package are used.

The estimation unit 103 uses an attack abnormality relationship table stored in the table storage unit 104 to estimate an attack.

The table storage unit 104 stores the attack abnormality relationship table in advance. The attack abnormality relationship table corresponds to attack abnormality relationship information, and indicates a correspondence relationship among (i) attack information, (ii) estimation abnormality information, and (iii) estimation abnormality location information. The attack information indicates type of estimated attack that the electronic control system S is possible to receive from outside. The estimation abnormality information indicates abnormality estimated to be occurred in the electronic control system S. The estimation abnormality location information indicates occurrence location of estimated abnormality.

FIG. 6 is a diagram illustrating an example of the attack abnormality relationship table. The attack abnormality relationship table illustrated in FIG. 6 indicates, for each type of cyberattack (attack A to attack X), abnormalities that occur when the electronic control system S is subjected to the cyberattack and corresponding ECU type where the abnormalities occur. As illustrated in FIG. 6, when a cyberattack is received, it is assumed that multiple abnormalities occur at respective ECUs. Thus, the attack abnormality relationship table may indicate a combination of multiple abnormalities that occur in response to reception of attack and ECUs where the multiple abnormalities occur. In the example illustrated in FIG. 6, the attack information includes the type of cyberattack (attacks A to X), an estimated start point location of the attack and an estimated target location of the attack when the cyberattack is received.

For example, when a cyberattack of type A is received, the electronic control system S estimates that abnormality A, abnormality C, and abnormality D will occur in the external communication ECU. The attack start point location of the attack A is outside the electronic control system S, and the attack target location is an external communication ECU. The attack start point location may be a location inside the electronic control system S or may be outside the electronic control system S. When the attack start point location is outside the electronic control system S, the received cyberattack has started from the outside of the vehicle.

The estimation unit 103 estimates a type of cyberattack received by the electronic control system S using the attack abnormality relationship table. Specifically, the estimation unit 103 extracts a combination of ECU ID and event ID (or sensor ID) indicated in each security log included in the log package set by the log package setting unit 102, and determines whether estimation abnormality information and estimation abnormality location information corresponding to the extracted combination are included in the attack abnormality relationship table. When a combination of the estimation abnormality information and the estimation abnormality location information, which matches the extracted ECU ID and event ID (or sensor ID), exists in the attack abnormality relationship table, it is estimated that the electronic control system S is attacked by the corresponding attack type. Such an estimation method is also known as pattern matching because it involves comparison with the attack abnormality relationship table.

When the combination of the estimation abnormality information and the estimation abnormality location information, which is completely identical to the extracted event ID (or sensor ID) and the extracted ECU ID, does not exist in the attack abnormality relationship table, the attack type corresponding to the closest combination of the estimation abnormality information and the estimation abnormality location information may be estimated as the attack that the electronic control system S has received. Alternatively, in a case where the matching ratio is equal to or greater than a predetermined threshold value of matching degree, it may be estimated that the electronic control system S is attacked with an attack type corresponding to a combination of the estimation abnormality information and the estimation abnormality location information. For example, the threshold value of matching degree may be set to within a range of 0.8 to 0.95.

In the example shown in FIG. 6, the estimation unit 103 may further estimate the attack start point location and the attack target location of the attack. In the example of FIG. 6, the attack information of the attack abnormality relationship table includes the attack type, the attack start point location, and the attack target location. Thus, the estimation unit 103 can estimate the attack type, the attack start point location, and the attack target location using the attack abnormality relationship table. The attack start point and the attack target may be estimated without estimating the attack type.

When there is a security log included in the log package and not used for estimation by the estimation unit 103, the security log may be returned to the log package setting unit 102. In this case, the log package setting unit 102 includes, in a log package to be newly set, the returned security log that has been included in an already-set log package and has not been used for estimation by the estimation unit 103. For example, as illustrated in FIG. 5B, assume that security logs L1, L2, and L3 are used for attack estimation, but the security log L4 is not used for attack estimation. In this case, the estimation unit 103 returns the security L4 to the log package setting unit 102. Then, the log package setting unit 102 sets the log package 2 by including the returned security log L4 together with security logs L5 to L9.

The output unit 105 outputs attack information indicating the attack estimated by the estimation unit 103. For example, in FIG. 6, when the attack type is estimated to be attack A, the output unit 105 outputs information indicating that the attack type is attack A as the attack information. Alternatively, the output unit 105 may output, as the attack information, information indicating that (i) the attack type is attack A, (ii) the attack start point is outside, and (ii) the attack target is the communication ECU.

Here, the term "attack information" may be any information related to an attack such as an attack route including a start point of the attack or an attack target, or damage caused by the attack, in addition to the type or classification of the attack.

(2) Specific Example of Log Package Setting Unit 102

As described above, the log package setting unit 102 sets the log package according to a certain rule. Hereinafter, examples of a certain rule will be described.

(a) Predetermined Period

The log package setting unit 102 sets, as the log package, security logs which have occurrence time points within the predetermined period. The occurrence time point is included in each security log. In the examples of FIG. 5A and FIG. 5B, the predetermined period for setting the log package is set as period t1. For example, the occurrence time of the abnormality included in the security log is indicated by the time stamp as shown in FIG. 3.

Here, the "predetermined period" may be a fixed period, or may be a variable period that varies depending on conditions.

It is desirable to set an average required period of one attack as the period t1. For example, an average required period obtained by statistically analyzing attacks received in past may be used as the predetermined period. Alternatively, the predetermined period may be set by receiving feedback on the required time of the attack received in the past from the estimation unit 103.

Further, the period t1 may be determined in consideration of the processing speed of the ECU and the type of the in-vehicle network.

The period of t1 may be a different value depending on the vehicle state, such as the change time of power supply, a traveling or stopped state of the vehicle, or a traveling speed.

As another example, different predetermined periods may be set, and correspondingly, log packages having different ranges may be set in parallel. Then, the attacks may be estimated using the respective log packages having different ranges in parallel.

For example, in a case where the predetermined period is t1 (corresponding to a first predetermined period) and a different predetermined period t2 (corresponding to a second predetermined period) are set, the log package setting unit 102 sets a first log package to include security logs having occurrence time points of the abnormality are within the predetermined period t1, and sets a second log package to include security logs having occurrence time points of the abnormality are within the different predetermined period t2. The estimation unit 103 estimates an attack on the electronic control system S based on the first log package and the second log package. Then, the output unit 105 outputs attack information indicating an attack estimated in the first log package or the second log package. For example, attack information estimated based on a log package that successfully estimated the abnormality may be output. Both attack information indicating an attack estimated in the first log package and attack information indicating an attack estimated in the second log package may be output. In this case, a priority may be given to the attack information indicating an attack estimated in the first log package or the attack information indicating an attack estimated in the second log package.

When multiple predetermined periods are set, the predetermined periods may be set not in parallel but in order from the longest period, for example, and an attack may be estimated in order from the longest predetermined period. That is, the processing may be performed serially instead of in parallel. In this case, for example, when an attack is estimated by using a predetermined matching degree, setting and estimation of a log package in the remaining predetermined period may be omitted.

FIG. 7 shows an example of abnormality occurrence situation in the ECU20. It is assumed that the abnormality occurrence time elapses from the left to the right in the drawing. In the example of FIG. 7, due to the attack A, abnormalities occur in the ECU20*a*, the ECU20*a*, the ECU20*c*, the ECU20*d*, and the ECU20*d* by five times in the described order. In addition, due to the attack B, abnormalities occur in the ECU20*d*, the ECU20*c*, the ECU20*d*, and the ECU20*e* by four times in the described order. For example, it is assumed that period t1 is set to 5 seconds, period t2 is set to 2 seconds, period t3 is set to 10 seconds, and the matching degree of the estimation unit 103 is set to 0.8 or higher. In this case, within periods t1, attack A (matching degree 80%) and attack B (matching degree 100%) can be estimated by respective log packages divided in unit of period t1. Within periods t2, since the length of log package is not sufficient, a combination corresponding to the attack abnormality relationship table does not exist, and no attack is estimated. Similarly, within period t3, since the length of log package is excessively long, a log package including security logs related to two attacks, attack A and attack B, does not exist in the attack abnormality relationship table. As a result, no attack is estimated. Therefore, the output unit 105 outputs attack information based on the log package divided according to the period t1 in which the attack is successfully estimated.

Note that the above example is a case where attack estimation is succeeded only in one predetermined period, but when attack estimation is succeeded in multiple predetermined periods, it is desirable to select the information closest to the estimation abnormality information and the estimation abnormality location information in the attack abnormality relationship table, that is, the information with the highest matching degree.

The number of multiple predetermined periods may be two or more. In the case of three or more different predetermined periods, different two of the predetermined periods correspond to the first predetermined period and the second predetermined period.

The log package setting unit 102 may set the log package by packaging security logs acquired by the log acquiring unit 101 within the predetermined period. That is, the log package may be set based on the reception time of the abnormality instead of the occurrence time of the abnormality.

As described above, by using log packages included in multiple different predetermined periods, it is possible to increase the estimation accuracy of cyberattack.

(b) Information Included in Security Log

The log package setting unit 102 sets the log package using information included in the security log.

(b-1) ECU Type Information

The log package setting unit 102 sets the log package using, for example, ECU type information, which is information for specifying the ECU20. The ECU type information is, for example, an ECU ID as shown in FIG. 3.

Specifically, a range is set to include two types of ECU IDs (N=2) as a log package in consideration of a characteristic that a security log is output in the ECU 20 of an attack source (attack start point) and a security log is output in another ECU 20 of an attack destination (attack target), in response to attack detection. In consideration of erroneous detection, three types of ECU IDs, that is, N=2 may be set.

A range in which three types (N=3) of ECU IDs are included is set as the log package in consideration of a characteristic that security log is output in the ECU 20 of an attack source (attack start point), a security log is output in another ECU 20 of an attack destination (attack target), and a security log is output in a further another ECU 20 of relay point, in response to attack detection.

Further, as described above in section (a) and FIG. 7, an attack may be estimated using the log package of N=2 and log package of N=3 in parallel based on respective log packages.

As an example of using the ECU type information, in a case where type information of ECU that is not physically directly connected is detected, the log package is set by detecting a time point immediately before the type information as the separation.

(b-2) Sensor Type Information

The log package setting unit 102 sets the log package using, for example, sensor type information, which is information used for specifying the security sensor. The sensor type information is, for example, the sensor ID or the event ID as shown in FIG. 3.

For example, in a case where an abnormality is detected by the reception sensor of a certain ECU and then an abnormality is detected by the transmission sensor of the same ECU, it can be estimated that the ECU has received a certain attack and the attacked ECU attacks another ECU. Thus, the gap can be set as the separation.

The sensor type information and the ECU type information may be used together.

(b-3) Other Information Included in Security Log

The log package setting unit 102 may set the log package using, for example, the time stamp or vehicle architecture information included in the context data. For example, an IP address or a MAC address included in the context data may be used to set the log package.

(c) Other Rules

The log package may be set by dividing the security logs at the time when a state of power supply mounted on the vehicle changes. For example, the log package may be set with each switching time of OFF, +B, ACC, and ON as the separation.

Further, the log package may be set with a case where a logical product or a logical sum of at least two rules among the rules described in sections (a), (b), and (c) is satisfied as the separation. For example, the log package may be roughly set based on the predetermined period in the preceding stage, and then the log package may be further set in detail based on the ECU type information in the subsequent stage, using the predetermined period and the ECU type information.

(3) Operation of Attack Analysis Device 10

(a) Basic Operation

The operation of the attack analysis device 10 will be described with reference to FIG. 8. FIG. 8 not only shows an attack analysis method executed by the attack analysis device 10, but also shows a processing procedure of an attack analysis program executable by the attack analysis device 10. The process is not limited to the order illustrated in FIG. 8. That is, the order may be properly changed as long as there is no restriction such as a relationship in which a result of a previous step is used in a subsequent step.

In S101, the log acquiring unit 101 acquires the security log generated by the security sensor mounted on each ECU 20 constituting the electronic control system S. In S102, the log acquiring unit 101 outputs the acquired security log to the log package setting unit 102.

In S103, the log package setting unit 102 sets the log package in which multiple security logs acquired in S101 are packaged. In S104, the log package setting unit 102 outputs the set security logs to the estimation unit 103.

In S105, the estimation unit 103 estimates an attack on the electronic control system S based on the log package set in S103. In S106, the estimation unit 103 outputs the attack information to the output unit 105.

In S107, the output unit 105 outputs the attack information indicating the attack estimated in S105.

When there is a security log included in the log package and not used for estimation in S105, the estimation unit 103 returns the security log to the log package setting unit 102 in S108.

In the next S103, the log package setting unit 102 sets a new log package including the security log output in S108.

(b) Specific Operation Example of Log Package Setting Unit 102 and Estimation Unit 103

A specific operation example of the log package setting unit 102 and the estimation unit 103 of the attack analysis device 10 will be described with reference to FIG. 9A to FIG. 9C.

Figure 9A:
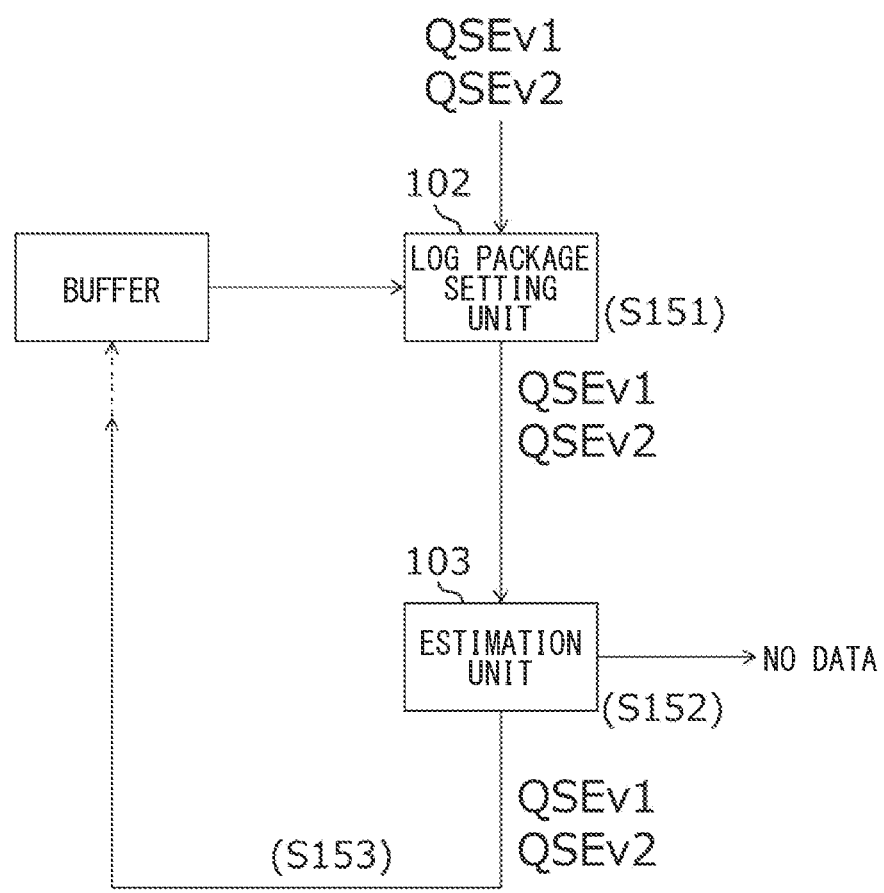
FIG. 9A is a diagram illustrating an operation of the attack analysis device according to the first embodiment.

As shown in FIG. 9A, in S151, the log package setting unit 102 generates the log package in which QSEv1 and QSEv2, which are security logs acquired by the log acquiring unit 101, are packaged. The estimation unit 103 estimates an attack based on the log package including security logs QSEv1 and QSEv2. However, the information corresponding to this combination does not exist in the attack abnormality relationship table. Thus, estimation result indicating no abnormality is output in S152. Therefore, the estimation unit 103 outputs QSEv1 and QSEv2 that are not used for estimation to the buffer of the log package setting unit 102 in S153.

Figure 9B:
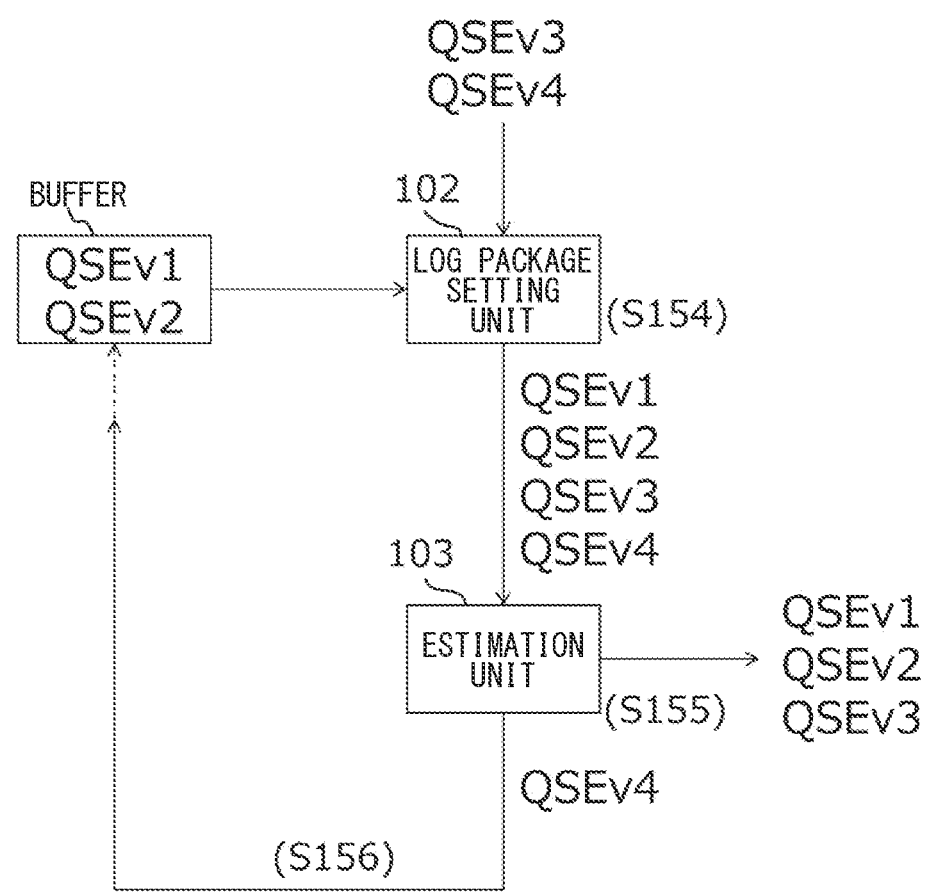
FIG. 9B is a diagram illustrating an operation of the attack analysis device according to the first embodiment.

As shown in FIG. 9B, the log package setting unit 102 generates the log package such that the log package includes the security logs QSEv3 and QSEv4, which are acquired by the log acquiring unit 101, and the security logs QSEv1 and QSEv2 accumulated in the buffer in S154. The estimation unit 103 estimates an attack based on the log package including the security logs QSEv1 to QSEv4. In this case, since information corresponding to the combination of the security logs QSEv1 to QSEv3 exists in the attack abnormality relationship table, the security logs QSEv1 to QSEv3 are output as the estimation result in S155. Then, the estimation unit 103 outputs the QSEv4, which is not used for the estimation, to the buffer of the log package setting unit 102 in S156.

Figure 9C:
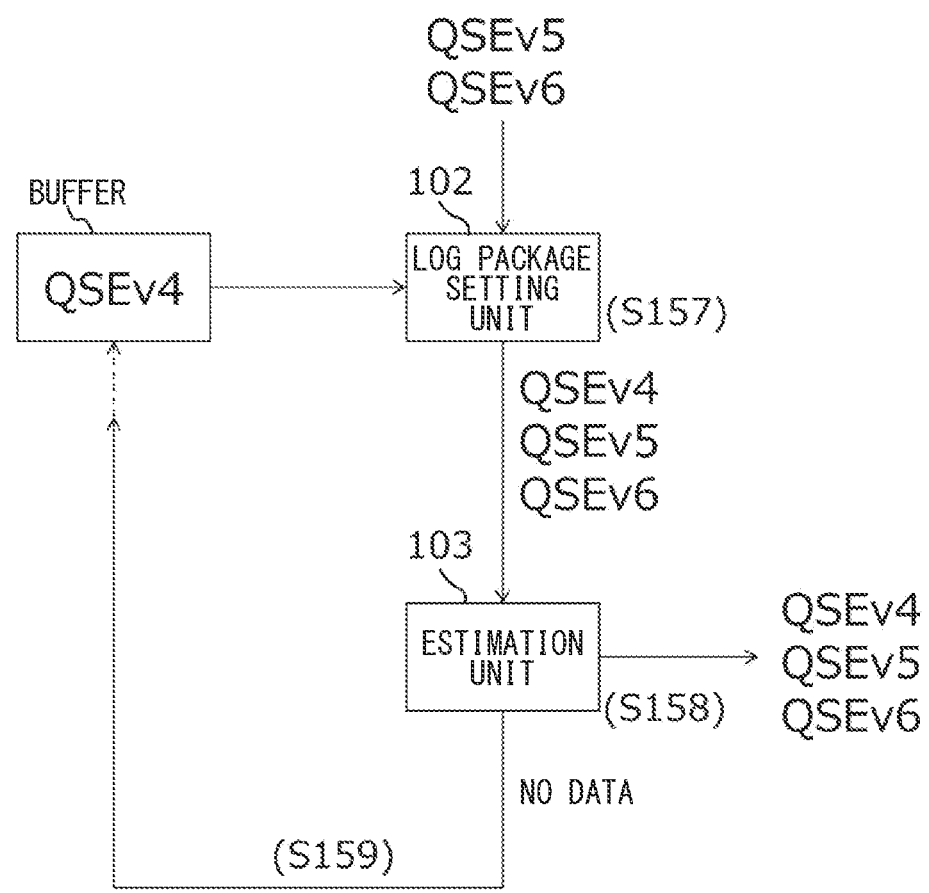
FIG. 9C is a diagram illustrating an operation of the attack analysis device according to the first embodiment.

As shown in FIG. 9C, the log package setting unit 102 generates the log package such that the log package includes security logs QSEv5 and QSEv6, which are security logs acquired by the log acquiring unit 101, and the security log QSEv4 accumulated in the buffer in S157. The estimation unit 103 estimates an attack based on the log package including the security logs QSEv4 to QSEv6. In this case, since information corresponding to the combination of security logs QSEv4 to QSEv6 exists in the attack abnormality relationship table, the security logs QSEv4 to QSEv6 are output as the estimation result in S158. In this case, since there is no security log not used for estimation by the estimation unit 103, no security log is output from the estimation unit 103 to the buffer of the log package setting unit 102 in S159.

Note that returning a security log that is not used for estimation to the buffer of the log package setting unit 102 and using the buffered security log for setting a log package again is effective particularly when the log package setting unit 102 sets a log package based on a predetermined period, but is not limited thereto. For example, even when the log package is set based on the ECU type information, it is effective in absorbing an error in the setting of the log package.

In the above-described example, the buffer is provided in the log package setting unit 102. Alternatively, the buffer may be provided separately from the log package setting unit 102.

(4) Overview

As described above, according to the present embodiment, since a log package in which security logs are packaged is set and an attack is estimated based on the set log package, the efficiency of analysis and collation of attack is improved. As a result, the detection accuracy of attack can be improved.

According to the present embodiment, since the log package is generated by packaging the security logs acquired in the predetermined period, the time length of the log package can be set in consideration of the characteristics of cyberattack, the hardware performance of the attack analysis device, and the like. By setting multiple different predetermined periods in parallel, an analysis result with the highest attack detection accuracy can be obtained.

According to the present embodiment, since the log package is set using the information included in the security log, it is possible to detect a separation in the security log groups that can be estimated from the information included in the log package.

By including the security log not used for estimation in the log package to be newly set, the security logs can be used without excess or deficiency. Therefore, the efficiency of analysis and collation of attack is further improved. As a result, the detection accuracy can be improved.

3. Second Embodiment

Since a configuration of a vehicle system mounted on a vehicle varies depending on type, model, and manufacturer of the vehicle, a combination of abnormalities caused by a cyberattack may vary depending on the configuration of the vehicle system. Therefore, in order to identify a cyberattack using a combination of abnormalities, it is necessary to set an abnormality detection pattern and an analysis rule for each vehicle system.

In order to increase the versatility of the attack analysis device, the present embodiment describes an attack analysis device 11 that uses, for attack estimation purpose, a commonized security log commonized with a different electronic control system, which is a system different from the electronic control system S.

(1) Configuration of Attack Analysis Device 11

Figure 10:
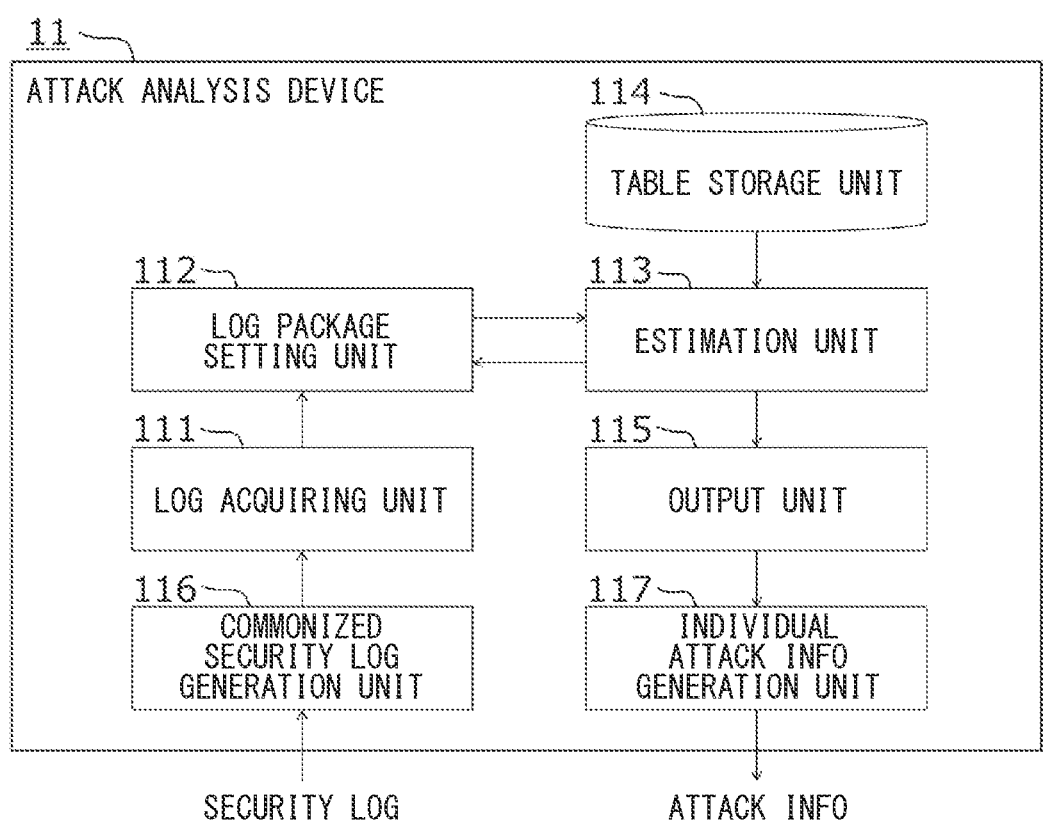
FIG. 10 is a block diagram illustrating an exemplary configuration of the attack analysis device according to a second embodiment.

FIG. 10 is a block diagram illustrating a configuration of the attack analysis device 11 according to the present embodiment. The attack analysis device 11 includes a log acquiring unit 111, a log package setting unit 112, an estimation unit 113, a table storage unit 114, an output unit 115, a commonized security log generation unit 116, and an individual attack information generation unit 117.

The commonized security log generation unit 116 generates a commonized security log by converting the security log generated by the security sensor mounted on each ECU 20 of the electronic control system S.

The security log includes (i) abnormality information indicating an abnormality detected in the electronic control system S and (ii) abnormality location indicating a location of one ECU 20 in which the abnormality is occurred among the multiple ECUs 20 constituting the electronic control system S. The abnormality information corresponds to the sensor ID, the event ID, the counter, the time stamp, or the context data shown in FIG. 3. The abnormal location corresponds to the ECU ID shown in FIG. 3. The commonized security log generation unit 116 converts the abnormality location into a commonized abnormality location commonized between the electronic control system S and another electronic control system, and generates commonized abnormality location information.

The conversion from the abnormality location to the commonized abnormality location can be performed using, for example, a location relationship table stored in a storage unit (not illustrated). The location relationship table indicates a correspondence relationship between (i) an individual location which is a location specific to each ECU constituting the electronic control system S and (ii) a commonized location which is a location common to the electronic control system S and another electronic control system.

Figure 11:
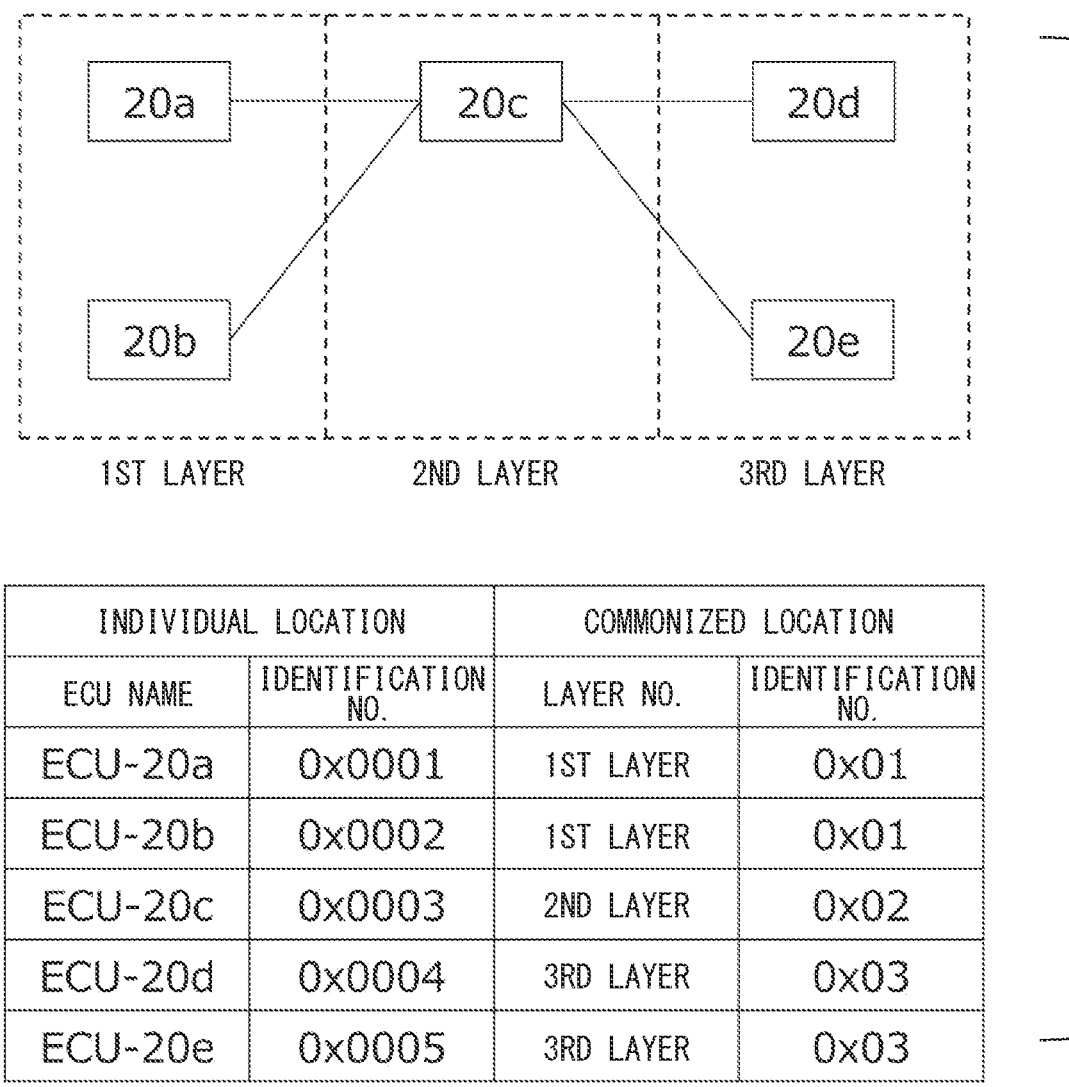
FIG. 11 is a diagram illustrating a location relationship table used by a commonized security log generation unit and an individual attack information generation unit of the attack analysis device according to the second embodiment.

FIG. 11 illustrates a specific example of the location relationship table. The location relationship table of FIG. 11 shows a correspondence relationship between an individual location for specifying an individual ECU and a commonized location for specifying a defense layer to which the individual ECU belongs.

As shown in FIG. 11, the association between the individual location and the commonized location is implemented based on, for example, a security defense layer of the electronic control system, that is, based on security level. In many electronic control systems S, defense in depth is adopted by using multi-layer protection in order to improve security against attacks. By providing the security function in hierarchical and multi-layer protection as a countermeasure to the attack, when one countermeasure (that is, the first layer) is breached in the event of the attack, the next countermeasure (that is, the second layer) can defend against the attack. Thus, it is possible to increase the defense power of the electronic control system. Thus, the electronic control system S using the defense in depth (multi-layer protection) includes multiple layers having different security levels from one another. Thus, the electronic control system S is divided into multiple layers according to the different security levels, and an individual location, which is a location specific to each ECU in the electronic control system S, is associated with a commonized location by determining each ECU belongs to which layer among the multiple layers. That is, in this example, the commonized location corresponds to the defense layer in the electronic control system S. The term security level is an index indicating security against attacks or deterrence against attacks.

As another example, the individual location and the commonized location may be associated with one another based on the function of the ECU. For example, it is assumed that the ECU 20a and the ECU 20b belong to the same security level. In a case where the ECU 20a controls the engine and requires high safety, and the ECU 20b controls air conditioning and does not require high safety as ECU 20a, the ECU 20a and the ECU 20b may be associated with different commonized locations from one another.

In FIG. 11, the log acquiring unit 111, the log package setting unit 112, the estimation unit 113, the table storage unit 114, and the output unit 115 are similar to the log acquiring unit 101, the log package setting unit 102, the estimation unit 103, the table storage unit 104, and the output unit 105 of first embodiment except that the processing target is the commonized security log.

The log acquiring unit 111 acquires the commonized security log generated by the commonized security log generation unit 116.

The log package setting unit 112 sets a log package in which multiple commonized security logs acquired by the log acquiring unit 111 are packaged.

The estimation unit 113 estimates an attack on the electronic control system S based on the log package set by the log package setting unit 112.

The table storage unit 114 stores the attack abnormality relationship table in advance. In the present embodiment, the attack abnormality relationship table indicates a correspondence relationship among (i) attack information, (ii) estimation abnormality information, and (iii) commonized estimation abnormality location information. The attack information indicates type of estimated attack that the electronic control system S is possible to receive from outside. The estimation abnormality information indicates abnormality estimated to be occurred in the electronic control system S when the attack is received. The commonized estimation abnormality location information indicates commonized location of the abnormality which is estimated to be occurred.

The output unit 115 outputs attack information indicating the attack estimated by the estimation unit 113.

The individual attack information generation unit 117 converts the attack information output by the output unit 115 into individual attack information and outputs the converted individual attack information. The conversion from the attack information to the individual attack information can be performed, for example, by converting the attack start point or the attack target included in the individual information from the commonized location to the individual location. This conversion can be performed using the location relationship table, which is used by the commonized security log generation unit 116.

The commonized security log generation unit 116 and the individual attack information generation unit 117 may be included in the electronic control system S, instead of the attack analysis device 11. That is, in FIG. 1C, the commonized security log generation unit 116 and the individual attack information generation unit 117 may be provided in any ECU 20 included in the electronic control system S. In this case, the configuration of attack analysis device 11 is substantially the same as the configuration of attack analysis device 10 of first embodiment except for the contents of the attack abnormality relationship table stored in the table storage unit 114.

(2) Specific Example of Log Package Setting Unit 112

In the first embodiment, the log package setting unit 102 sets the log package using one or more predetermined periods and various types of information such as ECU type information and sensor type information included in the security log. The log package setting method of the first embodiment can also be used in the present embodiment.

In the case of the commonized security log, a defense layer corresponding to a commonized abnormality location is included instead of the ECU type information corresponding to an individual location. Therefore, the log package setting unit 112 may set the log package using, for example, information of defense layer corresponding to the commonized abnormality location of the ECU 20.

For example, when the security log indicates that the security log has reached a certain defense layer, the separation between the log packages may be defined.

(3) Modification Example of Attack Analysis Device 11

When the log package is generated using the commonized security log, since the commonized abnormality location included in the commonized security log is generated by abstracting an individual abnormality location, the accuracy of detecting separation between the log packages may decrease.

In order to maintain the accuracy of detecting separation between log packages, the input portion of the attack analysis device 11 may be provided in the order of the log acquiring unit 111, the log package setting unit 112, and the commonized security log generation unit 116.

In the above arrangement, since the log package and separation between log packages are set using the normal security logs, the log package can be set without reducing the accuracy of detecting the separation between log packages.

(4) Operation of Attack Analysis Device 11

Since the operation of the attack analysis device 11 is basically the same as the operation of the attack analysis device 10 of the first embodiment, the description and the drawings of first embodiment are applied to the operation of the attack analysis device 1 after replacing the configuration specific to the first embodiment to the configuration specific to the present embodiment.

(5) Conclusion

As described above, according to the present embodiment, by using the commonized security log, the estimation unit and the attack abnormality relationship table can be commonized to various types of electronic control systems. That is, it is not necessary to prepare an attack abnormality relationship table for each electronic control system, and processing load of pattern matching in the estimation unit can be reduced.

The features of the attack analysis device are described in each embodiment of the present disclosure as above.

The terms used in the above embodiments are examples, the terms may be replaced with synonymous terms or terms including synonymous functions.

In the block diagrams used to describe the embodiments, the configurations of the devices are classified and organized for each function. The blocks representing the respective functions may be implemented by any combination of hardware or software. Since the block diagrams illustrate the functions, the block diagrams also correspond to the method and program that implement the method.

Functional blocks that can be understood as processes, flows, and methods described in the respective embodiments may be changed in order as long as there is no restriction such as a relationship in which results of preceding other steps are used in subsequent step.

The terms "first", "second", or "N" (N is an integer) used in each embodiment and the present disclosure are used to distinguish two or more configurations and methods of the same type, it does not limit the order or superiority.

Each of the embodiments described vehicular attack analysis device for analyzing cyberattack on an electronic control system mounted on a vehicle. The present disclosure is not limited to vehicle use. The present disclosure may include a dedicated or general-purpose device other than a vehicular device.

Embodiments of the attack analysis device of the present disclosure include the following. Examples of the present disclosure as a component may include a semiconductor device, an electronic circuit, a module, and a microcomputer. Examples of the present disclosure as a semi-finished product may include an electronic control unit (ECU), and a system board. Examples of the present disclosure as a finished component may include a smartphone, a tablet computer, a personal computer (PC), a work station, and a server. Other examples of the present disclosure may include a device having communication function, such as a video camera, a still camera, or a car navigation system.

Necessary functions such as an antenna or a communication interface may be properly added to the attack analysis device.

The attack analysis device according to the present disclosure may be used for the purpose of providing various services, especially when used on the server side. Such provision of service may use the attack analysis device according to the present disclosure, the method according to the present disclosure, or/and execution of the program according to the present disclosure.

The present disclosure may be implemented by not only dedicated hardware having the configurations and functions described in each embodiment but also as a combination of a program recorded in a storage medium such as a memory or a hard disk and provided to implement the present disclosure, and general-purpose hardware having a dedicated or general-purpose CPU, which can execute the program, and having a memory and the like.

A program may be stored in a non-transitory tangible storage medium of a special-purpose or general-purpose hardware (e.g., computer), such as (i) an external storage (e.g., hard disk, USB memory, CD/BD), or (ii) an internal storage (e.g., RAM, ROM). Such a program may be downloaded from the server and provided to the special-purpose or general-purpose hardware via the storage medium or without using the storage medium through a communication link. As the program is upgraded, the corresponding latest function can be continually provided.

The attack analysis device according to the present disclosure is mainly applied as a device that analyzes a cyber-attack received by an electronic control system mounted on an automobile vehicle. Alternatively, the attack analysis device according to the present disclosure may be applied as a device that analyzes an attack on a system, which is not mounted on an automobile vehicle.

What is claimed is:

1. An attack analysis device comprising:
a computer configured to:
   acquire a security log generated by a security sensor mounted on each of a plurality of electronic control units configuring an electronic control system;
   set a log package in which a plurality of the security logs are packaged;
   estimate an attack received by the electronic control system based on the log package;
   output attack information indicating the estimated attack; and
   set the log package by packaging the plurality of security logs that have occurrence time points of abnormalities indicated by respective security logs within a first predetermined period and a second predetermined period, a length of the second predetermined being set to be different from a length of the first predetermined period.

2. The attack analysis device according to claim 1, wherein:
the computer is further configured to:
   set a first log package by packaging the plurality of security logs which have occurrence time points of abnormalities indicated by respective security logs within the first predetermined period;
   set a second log package by packaging the plurality of security logs which have occurrence time points of abnormalities indicated by respective security logs within the second predetermined period;
   estimate the attack received by the electronic control system based on each of the first log package and the second log package; and
   output the attack information indicating the attack estimated in the first log package or the attack estimated in the second log package.

3. The attack analysis device according to claim 1, wherein
the computer is further configured to set the log package using type information of each electronic control unit, which is included in each of the plurality of security logs and used for specifying corresponding electronic control unit.

4. The attack analysis device according to claim 1, wherein
the computer is further configured to set the log package using sensor type information, which is included in each of the plurality of security logs and used for specifying the security sensor.

5. The attack analysis device according to claim 1, wherein,
when one of the plurality of the security logs has been included in the log package but is not used for estimating the attack by the estimation unit, the computer is configured to include the one of the plurality of the security logs in a new log package to be set after the log package.

6. The attack analysis device according to claim 1, wherein
the security log is a commonized security log,
the commonized security log includes abnormality information and commonized abnormality location information,
the abnormality information indicates an abnormality detected in the electronic control system,
the electronic control system includes the plurality of electronic control units, and
the commonized abnormality location information indicates a commonized abnormality location generated by converting an abnormality location, which is a location of one of the plurality of electronic control units where the abnormality is occurred, to a location commonized between the electronic control system and a different electronic control system.

7. The attack analysis device according to claim 6, wherein the computer is configured to set the log package using the commonized abnormality location information, which is information included in the security log.

8. The attack analysis device according to claim 1, wherein
the electronic control system is equipped to a moving object, and
the attack analysis device is disposed outside the moving object.

9. The attack analysis device according to claim 1, wherein
the electronic control system and the attack analysis device are equipped to a moving object.

10. The attack analysis device according to claim 1, wherein
the electronic control system and the attack analysis device are connected with one another by a wireless communication method or a wired communication method.

11. An attack analysis method executed by an attack analysis device, the method comprising:
acquiring a security log generated by a security sensor mounted on each of a plurality of electronic control units configuring an electronic control system;
setting a log package in which multiple security logs are packaged;
estimating an attack received by the electronic control system based on the log package;
outputting attack information indicating the estimated attack; and
setting the log package by packaging the plurality of security logs that have occurrence time points of abnormalities indicated by respective security logs within a first predetermined period and a second predetermined period, a length of the second predetermined being set to be different from a length of the first predetermined period.

12. A computer-readable non-transitory storage medium storing instructions of an attack analysis program to be executed by an attack analysis device, the instructions comprising:
- acquiring a security log generated by a security sensor mounted on each of a plurality of electronic control units configuring an electronic control system;
- setting a log package in which multiple security logs are packaged;
- estimating an attack received by the electronic control system based on the log package;
- outputting attack information indicating the estimated attack; and
- setting the log package by packaging the plurality of security logs that have occurrence time points of abnormalities indicated by respective security logs within a first predetermined period and a second predetermined period, a length of the second predetermined being set to be different from a length of the first predetermined period.

* * * * *